Feb. 21, 1961  H. J. STRAUSS  2,972,655
JOINTING OF METAL INSERTS TO PLASTIC MATERIALS
Filed Jan. 31, 1958

*INVENTOR.*
HOWARD J. STRAUSS

United States Patent Office 2,972,655
Patented Feb. 21, 1961

2,972,655

JOINTING OF METAL INSERTS TO PLASTIC MATERIALS

Howard J. Strauss, Abington Township, Montgomery County, Pa., assignor to The Electric Storage Battery Company, a corporation of New Jersey Filed Jan. 31, 1958, Ser. No. 712,578

2 Claims. (Cl. 136—168)

The invention generally relates to the jointing of metal inserts to plastic materials. More specifically, this invention relates to a liquid tight seal and the method of making such a seal between metal inserts and certain plastic materials.

The present invention has particular utility in the manufacture of storage batteries where it is necessary to obtain liquid tight seals between battery post bushings and battery covers. As will be explained hereinafter, however, this invention has broader aspects and is adapted for use with materials and constructions other than those used in storage batteries.

An object of the present invention is to provide a new and improved seal which is not only liquid tight, but also mechanically strong.

Another object of the present invention is to provide a new and improved seal which is economical to manufacture.

In the storage battery field, prior art methods of obtaining the desired seal between battery post bushings and battery covers generally comprise the use of a plurality of complicated ridges or flanges on the bushing to provide a large area of contact between the bushing and the cover and, accordingly, a longer path for acid creepage between the parts thus joined. Such methods, however, fail for two reasons. First, the covers, which are generally hard rubber, contain an excess of free sulphur. The bushings are generally lead. The free sulphur combines with the lead to form lead sulphide thus preventing a useful compression bond between the bushing and the cover. This not only provides a path for acid creepage and corrosion of the bushing and strap at the positive terminal, it also weakens the mechanical union of the parts. Secondly, lead bushings having a plurality of intricate ridges and flanges are difficult to cast. As a result, such bushings are often porous at critical points providing additional paths for acid creepage and corrosion.

Accordingly, it is still another object of the present invention to provide a seal between the battery cover and the battery post bushings which minimizes the area of contact between the hard rubber of the cover and the lead bushings.

A further object of the present invention is to provide a seal, between the battery post bushing and the battery cover, utilizing soft rubber, which has a minimum of free sulphur and thus eliminates the formation of lead sulphide and consequent deleterious effects.

A still further object of the present invention is to achieve a mechanically strong, liquid tight seal by utilizing the gasket like actions of soft rubber under compression.

Another object of the present invention is to provide a mechanically strong, liquid tight seal between a battery cover and simplified, easy-to-cast battery post bushings.

These and other objects of the present invention are accomplished in the manufacture of a battery cover by surrounding each of the lead battery post bushings with a soft rubber ring prior to placing them in the cover mold. The soft rubber rings are then compressed around the bushing under the pressure of the cover molding operation and remain under compression when the hard rubber of the cover is cured. The bushings themselves need only be adapted to retain and locate the soft rubber rings and thus can be of a design that can easily be cast. The ring can be either precured soft rubber or a soft rubber compound cured with the hard rubber cover.

A better understanding of the present invention may be had from the following description when read with reference to the accompanying drawings of which:

Figure 1:
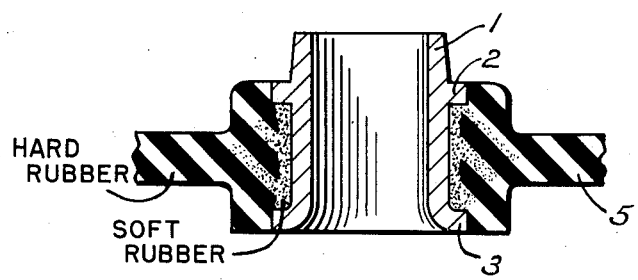
Fig. 1 is a sectional elevation of an embodiment of the present invention.

Referring now to the drawings, the numeral 1 designates a battery post bushing. In a lead-acid type battery the bushing 1 is a lead casting, but in other types of batteries it may be made of some other suitable metal. As shown, the bushing 1 has a pair of flanges 2 and 3 on its outer wall. The flanges 2 and 3 serve only to locate and retain in place soft rubber, which may be in the form of a ring 4, placed around the bushing 1. The ring 4 may be precured soft rubber or it may be a soft rubber compound placed around the bushing 1 between the flanges 2 and 3 and cured with the hard rubber of the cover.

The numeral 5 designates a battery cover which may be made of hard rubber or other suitable plastic material capable of being cast under pressure and solidifying in the mold with dimensional stability. In the manufacture of battery covers the battery post bushings are positioned in the cover mold and then the hard rubber of the cover is molded around them under great pressure. To provide the liquid tight seal of the present invention, the ring of soft rubber 4 is placed around the bushing 1 prior to placing the bushing in the cover mold. The soft rubber ring 4 is compressed and forced against the bushing 1 through the action of the fluid pressure exerted by the hard rubber material being molded thus providing a liquid tight seal between the cover 5 and the bushing 1. The compressed soft rubber ring 4 can be considered as acting like a gasket between the cover 5 and the bushing 1. It should be noted that the ring 4 remains under pressure when the hard rubber of the cover is cured, since the hard rubber substantially retains its dimensions upon vulcanization. In addition, the soft rubber gasket 4 becomes an integral part of the cover 5.

As shown in Fig. 1, there is no definite boundary between the hard rubber of the cover and the soft rubber of the gasket but there is a gradual transition between hard rubber and soft rubber under compression. Such a transition exists when the ring 4 is made of a soft rubber compound and is cured with the hard rubber compound of the cover.

Figure 2:
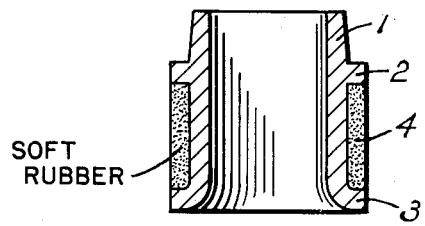
Fig. 2 is a sectional elevation of the bushing employed in the embodiment of the present invention shown in Fig. 1 with soft rubber in place prior to the molding of the cover.

The gasket like action of the compressed ring of soft rubber against the bushing 1 is so great that in addition to providing a liquid tight seal it provides a mechanically strong seal between the bushing and the cover. It should be specifically noted that this liquid tight mechanically strong seal is obtained without the use of complex bushings. In the configuration used for the bushing 1 shown in Figs. 1 and 2, the flanges 2 and 3 serve only to locate the ring 4 with respect to the cover 5. Since the hard rubber of the cover 5 is in contact with the bushing 1 only at the flanges 2 and 3, the area of contact between the two is minimized. As explained hereinbefore, this minimizes the formation of lead sulphide due to the combination of the free sulphur in the hard rubber with the lead of the bushing. The presence of lead sulphide between the cover and the bushing not only weakens the mechanical union between the parts, but it also provides a path for acid creepage.

Since soft rubber tends to harden with age when exposed to air, it is desirable to totally enclose the soft rubber ring 4 with either the lead of the bushing or the hard rubber of the cover. It should also be noted that because of the simplicity of design required for the bushing 1, such bushings can be economically and solidly cast. A solid non-porous casting is essential to provide an effective barrier to acid creepage.

The teachings of the present invention are not restricted to the joining of battery post bushings to battery covers, nor to the joining of the specific materials thus far described. In its broadest terms, the present invention applies to the joining of metal inserts to any plastic materials capable of being molded or cast under pressure and which solidify in the mold with dimensional stability so as to maintain under positive compression, around the insert, a compressible gasketing material. For example, the following list illustrates several possible combinations of materials for the gasket and for the compressing material to which the teachings of the present invention are applicable.

| Compressing material: | Gasket |
|---|---|
| Hard rubber | Soft rubber |
| Polystyrene | Polyethylene |
| Polystyrene | Soft rubber |
| Polyethylene | Polyethylene |
| Polyethylene | Soft rubber |

With respect to the use of polyethylene as the compressing material, it should be noted that this material contracts as it congeals. However, with proper design, the contraction of the polyethylene can be limited so as to retain the gasketing material under positive pressure.

Thus, the present invention provides a new and improved means for obtaining a mechanically strong liquid tight seal between metal inserts and certain plastic materials.

Having described this invention that which is claimed:

1. A method of manufacturing a mechanically strong liquid tight seal between battery post bushings and hard rubber battery covers comprising the steps of surrounding the bushings with soft rubber, molding said cover around said bushing under pressure, and curing said rubber so as to maintain said soft rubber under compression between the hard rubber and the bushing.

2. A battery cover comprising, in combination, a lead battery post bushing, a pair of flanges on the outside wall of said bushing, a soft rubber ring surrounding said bushing between said flanges, and a hard rubber composition molded around said bushing and soft rubber ring to form the cover and to compress said soft rubber against the bushing.

References Cited in the file of this patent

UNITED STATES PATENTS

| 1,474,510 | Campbell | Nov. 20, 1923 |
| 2,158,988 | Reetz | May 16, 1939 |
| 2,558,246 | Gray | June 26, 1951 |
| 2,678,960 | Jensen | May 18, 1954 |